US008165419B2

(12) United States Patent
Min et al.

(10) Patent No.: US 8,165,419 B2
(45) Date of Patent: Apr. 24, 2012

(54) HISTOGRAM STRETCHING APPARATUS AND HISTOGRAM STRETCHING METHOD FOR ENHANCING CONTRAST OF IMAGE

(75) Inventors: Kyoung Joong Min, Seoul (KR); Hak Sun Kim, Daejeon (KR); Won Tae Choi, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 881 days.

(21) Appl. No.: 12/238,244

(22) Filed: Sep. 25, 2008

(65) Prior Publication Data
US 2009/0087092 A1 Apr. 2, 2009

(30) Foreign Application Priority Data
Sep. 27, 2007 (KR) ................. 10-2007-0097576

(51) Int. Cl.
*G06K 9/40* (2006.01)
*G06K 9/00* (2006.01)
*G09G 1/14* (2006.01)
*G09G 3/28* (2006.01)
*G09G 5/02* (2006.01)
*G09G 5/00* (2006.01)
*G09G 5/10* (2006.01)
*G03F 3/08* (2006.01)
*H04N 9/64* (2006.01)
*H04N 5/202* (2006.01)

(52) U.S. Cl. .......... 382/274; 382/162; 358/518; 345/20; 345/63; 345/589; 345/600; 345/617; 345/690; 348/251; 348/254

(58) Field of Classification Search .................. None
See application file for complete search history.

(56) References Cited

U.S. PATENT DOCUMENTS
5,872,864 A * 2/1999 Imade et al. ................. 382/176
(Continued)

FOREIGN PATENT DOCUMENTS
JP 06-268866 A 9/1994
(Continued)

OTHER PUBLICATIONS
Sherrier et al. "Regionally Apaptive Histogram Equalization of the Chest", Mar. 1987, IEEE Transaction on medical imaging, vol. MI-6, No. 1, pp. 1-7.*

(Continued)

*Primary Examiner* — Randolph I Chu
(74) *Attorney, Agent, or Firm* — Lowe, Hauptman, Ham & Berner, LLP

(57) ABSTRACT

A histogram stretching apparatus and a histogram stretching method are disclosed to enhance image contrast by stretching a histogram of an input image within a range of a preset maximum expansion level and a preset minimum expansion level. The histogram stretching apparatus performs proper stretching suitable for a characteristic of the input image in due consideration of a saturation portion and a distribution range of a histogram of the input image. The histogram stretching apparatus can improve stretching effects by removing the saturated portion of the input image, and can prevent image distortion even for a monochromatic image. The histogram apparatus can improve histogram stretching effects by adjusting entire image levels of an image having a histogram frequency distribution skewed to a dark or bright side before a stretching operation.

8 Claims, 8 Drawing Sheets

U.S. PATENT DOCUMENTS

| | | | |
|---|---|---|---|
| 6,826,310 B2 * | 11/2004 | Trifonov et al. | 382/274 |
| 7,106,352 B2 * | 9/2006 | Deering | 345/694 |
| 7,508,993 B2 * | 3/2009 | Yuan et al. | 382/274 |
| 7,558,436 B2 * | 7/2009 | Zuro | 382/274 |
| 7,961,968 B2 * | 6/2011 | Hara | 382/254 |
| 2005/0078868 A1 * | 4/2005 | Chen et al. | 382/171 |
| 2006/0159340 A1 | 7/2006 | Lee | |
| 2007/0047834 A1 * | 3/2007 | Connell | 382/274 |

FOREIGN PATENT DOCUMENTS

KR    10-2006-0067723 A    6/2006

OTHER PUBLICATIONS

Wang et al. "Fast Image/Video Contrast Enhancement Based onn WTHE", 2006, Multimedia Signal Processing, 2006 IEEE 8th Workshop, pp. 338-343.*

* cited by examiner

HISTOGRAM STRETCHING APPARATUS AND HISTOGRAM STRETCHING METHOD FOR ENHANCING CONTRAST OF IMAGE

CROSS-REFERENCE TO RELATED APPLICATIONS

This application claims the priority of Korean Patent Application No. 2007-97576 filed on Sep. 27, 2007, in the Korean Intellectual Property Office, the disclosure of which is incorporated herein by reference.

BACKGROUND OF THE INVENTION

1. Field of the Invention

The present invention relates to a digital image processing technique, and more particularly, to a histogram stretching apparatus and a histogram stretching method which can enhance contrast of a digital image by analyzing a histogram of the image and stretching the histogram, so that the image sharpness can be improved.

2. Description of the Related Art

The contrast of an image means the degree of difference between dark and bright parts of the image. As the difference becomes greater, the contrast is enhanced. A high-contrast image may be considered as an image having high sharpness due to the clear difference between dark and bright parts of the image. If an image having low contrast is processed and converted into an image having high contrast, the sharpness of the corresponding image is improved and thus a high-quality image can be obtained.

Image histogram stretching is well known as one of image processing techniques for enhancement of the sharpness of a low-contrast image. A histogram of a high-contrast image has a wide frequency distribution over entire image levels. That is, the high-contrast image has sufficient frequencies in both dark and bright parts of the image and the frequencies of the high-contrast image are widely distributed over the entire image levels in the histogram. In contrast, a histogram of a low-contrast image has a relatively narrow frequency distribution with respect to image levels because the low-contrast image has a small difference between dark and bright parts of the image. In this case, an image having a clear difference between dark and bright parts thereof can be acquired by expanding the narrow frequency distribution of the low-contrast image. Such expansion of the frequency distribution of the histogram is called histogram stretching.

The image histogram stretching technique can contribute to enhancement of image sharpness if it is applied to an image acquired under normal circumstances. However, if the histogram stretching technique is applied to an image acquired under some special conditions, image distortion may occur, lowering the image quality. For example, the image enhancement may not be achieved or the image distortion may occur if the histogram stretching is collectively applied to an image having a very bright light source, i.e., a saturated portion therein, a monochromatic image having a very narrow histogram distribution, and an image having a histogram distribution skewed toward a high image levels (i.e., a bright side) or low image levels (i.e., a dark side).

Accordingly, there is a need for a technique allowing the histogram stretching to be performed properly in due consideration of capturing conditions, i.e., histogram distribution states of an input image on which the histogram stretching is to be performed.

SUMMARY OF THE INVENTION

An aspect of the present invention provides a histogram stretching apparatus which can effectively enhance contrast without distorting an input image even if the input image has a saturated portion or is a monochromatic image or an image having a histogram frequency distribution skewed toward a dark side or a bright side.

An aspect of the present invention also provides a histogram stretching method which can effectively enhance contrast without distorting an input image even if the input image has a saturated portion or is a monochromatic image or an image having a histogram frequency distribution skewed toward a dark side or a bright side.

According to an aspect of the present invention, there is a histogram stretching apparatus for improving contrast of an image by stretching a histogram of an input image within a range of a preset maximum expansion level to a preset minimum expansion level, the histogram stretching apparatus including: a histogram calculation unit calculating a histogram displaying a frequency according to an image level of each pixel included in an input image; a histogram analysis unit obtaining an accumulative distribution of the frequency according to the image level from the calculated histogram, determining a maximum value, a minimum value and a median value of an accumulative distribution of an area on which the histogram stretching is to be performed, and determining a minimum value, a maximum value and a median value of an image level area corresponding to the maximum value, the minimum value and the median value of the accumulative distribution; a linear-function application unit mapping the maximum value and the minimum value of the image level area determined at the histogram analysis unit to a linear function that changes linearly between the maximum expansion level and the minimum expansion level to calculate a modified maximum expansion level and a modified minimum expansion level; a gamma-curve application unit selecting a gamma curve with reference to the median value of the image level and mapping the minimum value and the maximum value of the image level to the selected gamma curve to calculate a modified maximum value and a modified minimum value of an image level; and a histogram stretching unit modifying an image level of each pixel of the input image by using the modified maximum expansion level, the modified minimum expansion level, the modified maximum value of the image level, and the modified minimum value of the image level.

The histogram analysis unit may obtain the accumulative distribution of the frequency according to the image level from the calculated histogram, may determine a portion having an image level higher than a preset threshold level as a saturated portion in the accumulative distribution, may determine a maximum value, a minimum value and a median value of an accumulative distribution area excluding the saturated portion from the accumulative distribution, and may determine a maximum value, a minimum value and a median value of the image level corresponding to the maximum value, the minimum value and the median value of the accumulative distribution area excluding the saturated portion.

The gamma-curve application unit may select a gamma curve having a greater gamma value as the median value of the image level is greater, and may map the minimum value and the maximum value of the image level to the selected gamma curve.

The histogram stretching unit may modify the image level of each pixel of the input image by using an equation below:

$$L_{out}(FH_H - FH_L) \times \frac{L_{in} - GH_L}{GH_H - GH_L} + FH_L$$

where $L_{out}$ represents a modified image level, $L_{in}$ represents an input image level, $FH_H$ represents a modified maximum expansion level, $FH_L$ represents a modified minimum expansion level, $GH_H$ represents a modified maximum value of an image level, and GHL represents a modified minimum value of an image level.

According to another aspect of the present invention, there is provided a histogram stretching method for improving contrast of an image by stretching a histogram of an input image within a range of a preset maximum expansion level to a preset minimum expansion level, the histogram stretching method including: calculating a histogram displaying a frequency according to an image level of each pixel of an input image; obtaining an accumulative distribution of the frequency according to the image level of the pixel of the input image; determining a maximum value, a minimum value and a median value of an accumulative distribution of an area on which histogram stretching is to be performed, from the accumulative distribution of the frequency according to the image level, and then determining a minimum value, a maximum value and a median value of an image level area corresponding to the maximum value, the minimum value and the median value of the accumulative distribution; mapping the maximum value and the minimum value of the image level area to a linear function that changes linearly between the maximum expansion level and the minimum expansion level to calculate a modified maximum expansion level and a modified minimum expansion level; selecting a gamma curve with reference to the median value of the image level; mapping the minimum value and the maximum value of the image level to the selected gamma curve to calculate a modified maximum value and a modified minimum value of the image level; and modifying the image level of each pixel of the input image by using the modified maximum expansion level, the modified minimum expansion level, the modified maximum value of the image level and the modified minimum value of the image level.

The determining a minimum value, a maximum value and a median value of an image level area may include: determining a portion having an image level higher than a preset threshold level as a saturated portion in the accumulative distribution of the frequency according to the image level; determining a maximum value, a minimum value and a median value of an accumulative distribution area excluding the saturated portion from the accumulative distribution; and determining a maximum value, a minimum value and a median value of the image level corresponding to the maximum value, the minimum value and the median value of the accumulative distribution area excluding the saturated portion.

The selecting a gamma curve may include selecting a gamma curve having a greater gamma value as the median value of the image level is greater.

The modifying the image level of each pixel of the input image may include modifying the image level of each pixel of the input image by using an equation below:

$$L_{out}(FH_H - FH_L) \times \frac{L_{in} - GH_L}{GH_H - GH_L} + FH_L$$

where $L_{out}$ represents a modified image level, $L_{in}$ represents an input image level, $FH_H$ represents a modified maximum expansion level, $FH_L$ represents a modified minimum expansion level, $GH_H$ represents a modified maximum value of an image level, and $GH_L$ represents a modified minimum value of an image level.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the figures, the shapes and dimensions of elements are exaggerated for clarity of illustration.

Figure 1:
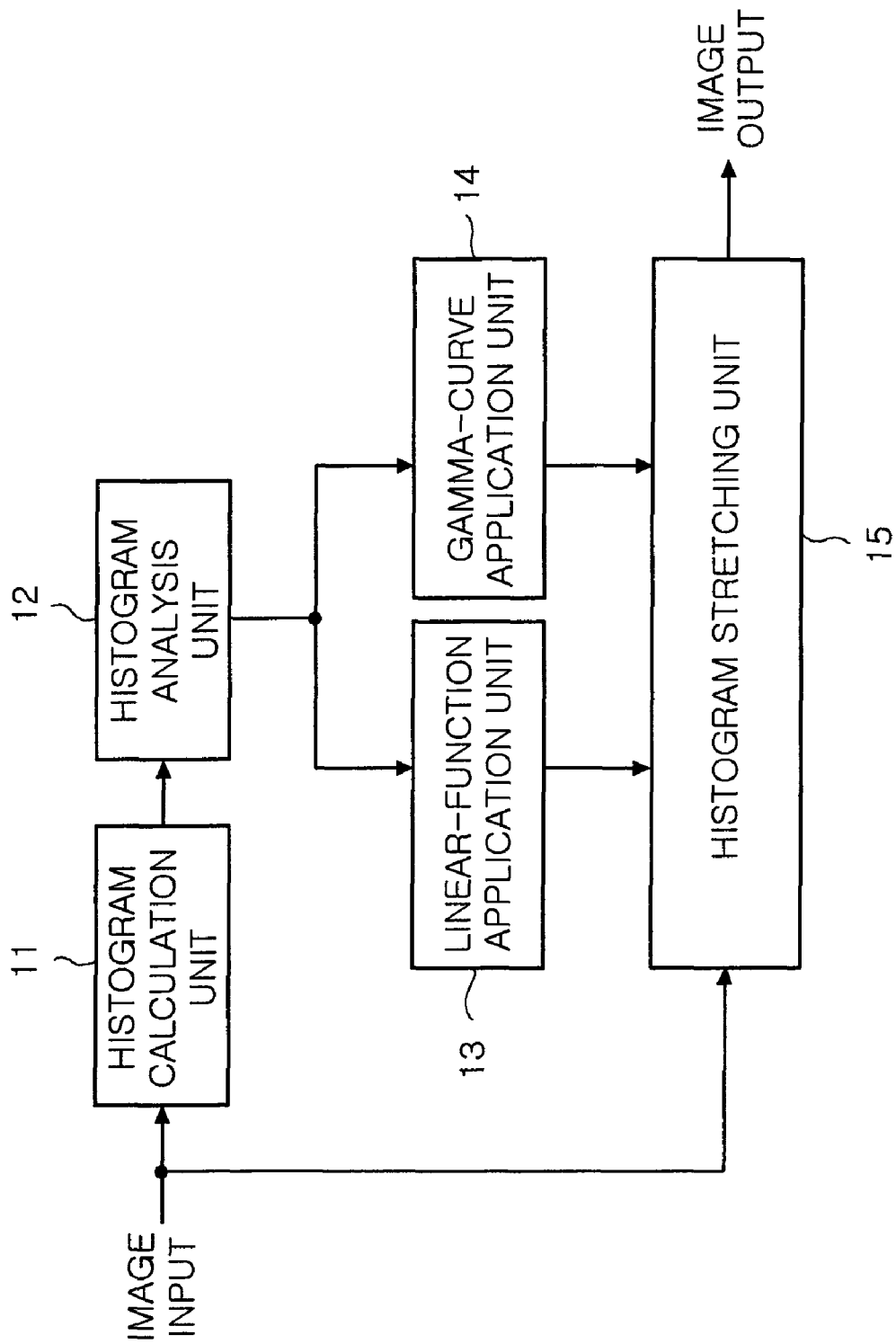
FIG. 1 is a block diagram of a histogram stretching apparatus for an image, according to an exemplary embodiment of the present invention.

FIG. 1 is a block diagram of a histogram stretching apparatus for an image according to an exemplary embodiment of the present invention.

Referring to FIG. 1, the histogram stretching apparatus for an image according to the current embodiment includes a histogram calculation unit 11, a histogram analysis unit 12, a linear-function application unit 13, a gamma-curve application unit 14, and a histogram stretching unit 15.

The histogram calculation unit 11 calculates a histogram displaying a frequency with respect to an image level of each pixel of an input image on which the histogram stretching is to be performed.

The histogram analysis unit 12 obtains an accumulative distribution of frequencies with respect to image levels from the histogram calculated by the histogram calculation unit 111. The histogram analysis unit 12 determines a maximum value, a minimum value and a median value of an accumulative distribution of a portion to undergo histogram stretching (hereinafter, also referred to as a histogram stretching portion). Then, the histogram analysis unit 12 determines a maximum value, a minimum value and a median value of an image level area corresponding to the maximum value, the minimum value and the median value of the accumulative distribution.

In more detail, the histogram analysis unit 12 obtains an accumulative distribution of frequencies with respect to the image levels from the histogram calculated by the histogram calculation unit 111, and then determines a portion having an image level higher than a preset threshold level as a saturated portion in the accumulative distribution. Thereafter, the histogram analysis unit 12 determines a maximum value, a minimum value and a median value of an accumulative distribution portion excluding the saturated portion from the accumulative distribution, and then determines a maximum value, a minimum value and a median value of an image level corresponding to the maximum value, the minimum value and the median value of the accumulative distribution portion excluding the saturated portion.

According to the present invention, the histogram analysis unit 12 contributes to effective sharpness enhancement by excluding the saturated portion of the input image such that the histogram stretching is not performed on the saturated portion.

The linear-function application unit 13 maps the maximum value and the minimum value of the image level area determined by the histogram analysis unit 12 to a linear function, which changes linearly between a preset maximum expansion level and a preset minimum expansion level for expanding a histogram through the histogram stretching, thereby calculating a modified maximum expansion level and a modified minimum expansion level. The linear function is used to map the maximum value and the minimum value of the image level area determined by the histogram analysis unit 12. If an input image is a monochromatic image with a very narrow histogram distribution, a new maximum expansion level and a new minimum expansion level are determined by mapping the maximum value and the minimum value of the image level area to the linear function. A maximum expansion level and a minimum expansion level set for a normal image may be set to a maximum value and a minimum value of an image level. However, distortion occurs if the maximum expansion level and the minimum expansion level set for the normal image are applied to, e.g., a monochromatic image. According to the present invention, the image distortion caused by the histogram stretching can be prevented by modifying the initially set maximum and minimum expansion levels into suitable values for an image having a very narrow histogram distribution through the mapping using the linear function.

The gamma-curve application unit 14 selects a gamma curve with reference to the median value of an image level determined by the histogram analysis unit 12. The gamma-curve application unit 14 maps a minimum value and a maximum level of the image level to the selected gamma curve, thereby calculating a modified maximum value and a modified minimum value of the image level.

The gamma curve indicates a relation between an output level and an input level of an image. The gamma curve is defined variously by a variable γ (gamma value). The gamma-curve application unit 14 determines a gamma value of the gamma curve with reference to the median value of the image level determined by the histogram analysis unit 12. If the gamma value is greater than one, the output level is lower than the input level, and if the gamma value is smaller than one, the output level is higher than the input level. When the median value of the image level is high, the gamma-curve application unit 14 determines that a histogram frequency distribution of an image is skewed toward a bright side and selects a gamma curve having a gamma value greater than one. Thus, the image levels can be moved to a dark side as a whole. Likewise, the gamma-curve application unit 14 determines that when the median value of the image level is small, the histogram frequency distribution of the image is skewed toward a dark side, and selects a gamma curve having a gamma value smaller than one. Therefore, the image levels can be moved to a bright side as a whole.

The efficient histogram stretching can be achieved through the gamma-curve application unit 14 by the appropriate compensation of an input image having a histogram frequency distribution skewed toward a bright or dark side.

The histogram stretching unit 15 modifies an image level of each pixel of the input image by using the modified maximum expansion level, the modified minimum expansion level, the modified maximum value of the image level, and the modified minimum value of the image level calculated by the linear-function application unit 13 and the gamma-curve application unit 14.

In general, Equation 1 below is known for histogram stretching:

$$L_{out}(F_H - F_L) \times \frac{L_{in} - H_L}{H_H - H_L} + FH_L \qquad \text{Equation 1}$$

In Equation 1, $L_{out}$ represents an image level modified by histogram stretching, and $L_{in}$ represents an input image level. $F_H$ and $F_L$ represent a maximum value and a minimum value of a preset stretching target value, i.e., the aforementioned maximum expansion level and minimum expansion level, respectively. $H_H$ and $H_L$ represent a maximum value and a minimum value of an image level of the input image, respectively. Equation 1 is an equation applied to the general histogram stretching, and does not consider a monochromatic image or an image having a skewed brightness distribution unlike the present invention.

The histogram stretching unit 15 according to the present invention performs stretching based on Equation 2 below by applying variables modified in due consideration of image characteristics by the linear-function application unit 13 and the gamma-curve application unit 14.

$$L_{out}(FH_H - FH_L) \times \frac{L_{in} - GH_L}{GH_H - GH_L} + FH_L \qquad \text{Equation 2}$$

where $L_{out}$ represents a modified image level, $L_{in}$ represents an input image level, $FH_H$ represents a modified maximum expansion level, $FH_L$ represents a modified minimum expansion level, $GH_H$ represents a modified maximum value of an image level, and $GH_L$ represents a modified minimum level of an image level.

According to the present invention, the image distortion caused by stretching can be prevented and the sharpness of an image can be improved by applying the maximum and minimum expansion levels modified in due consideration of a very narrow histogram frequency distribution, and the modified maximum and minimum values of an image level whose skewing has been compensated by the gamma curve.

Figure 2:
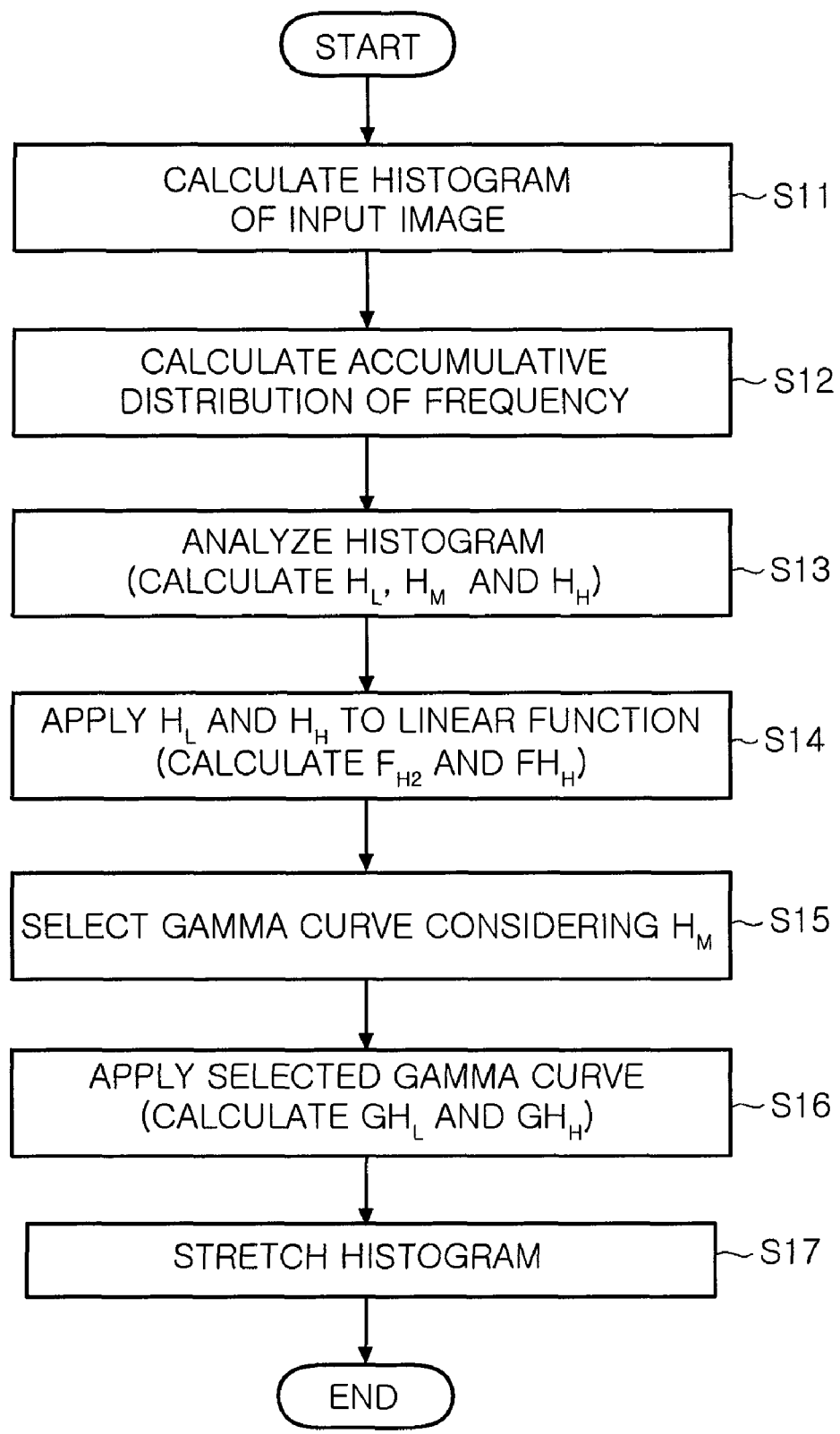
FIG. 2 is a flowchart of a histogram stretching method for an image, according to an exemplary embodiment of the present invention.

FIG. 2 is a flowchart of a histogram stretching method for an image, according to an exemplary embodiment of the present invention.

Referring to FIG. 2, the histogram stretching method for improving the contrast of an input image by stretching a histogram of the input image within a range of a preset maximum expansion level to a preset minimum expansion level, includes calculating a histogram displaying a frequency with respect to an image level of each pixel of an input image in operation S11, obtaining an accumulative distribution of frequencies according to image levels from the calculated histogram in operation S12, determining a maximum value, a minimum value and a median value of the accumulative distribution of a histogram stretching portion from the accumulative distribution of frequencies according to the image levels, and then determining a minimum value, a maximum value and a median value of an image level area corresponding to the maximum value, the minimum value and the median value of the accumulative distribution in operation S13, mapping the maximum value and the minimum value of the image level area determined by a histogram analysis unit to a linear function linearly changing between the maximum expansion level and the minimum expansion level to calculate a modified maximum expansion level and a modified minimum expansion level in operation S14, selecting a gamma curve with reference to the median value of the image level in operation S15, mapping a minimum value and a maximum value of the image level to the selected gamma curve to calculate a modified maximum value and a modified minimum value of the image level in operation S16, and modifying an image level of each pixel of the input image by using the modified maximum expansion level, the modified minimum expansion level, the modified maximum value of the image level and the modified minimum value of the image level in operation S17.

Figure 3A:
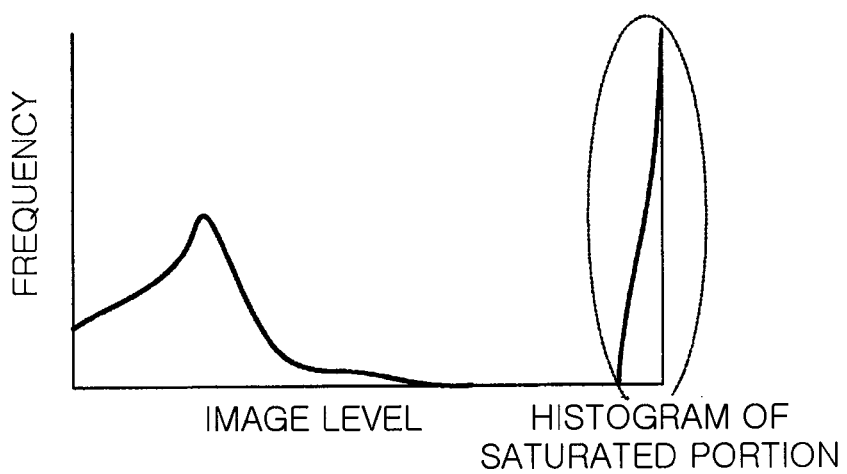
FIG. 3A is a diagram illustrating an example of a histogram of an input image.
Figure 3B:
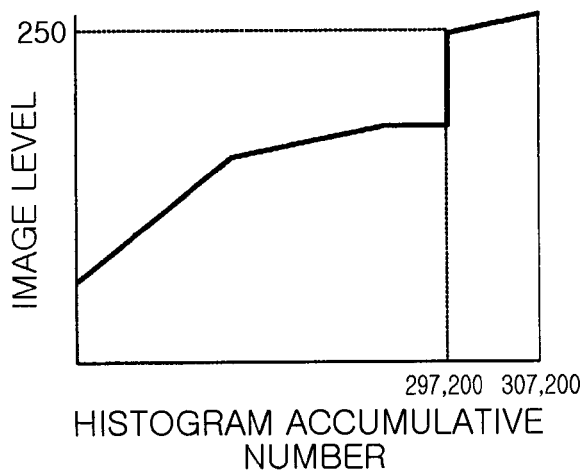
FIG. 3B is a diagram illustrating an accumulative distribution curve of frequencies with respect to image levels calculated from the histogram of FIG. 3A.
Figure 3C:
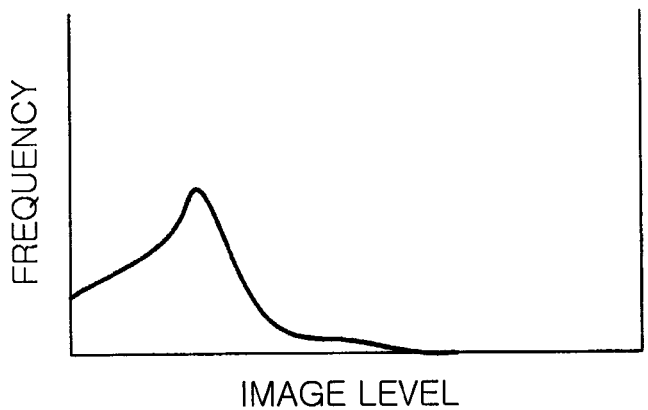
FIG. 3C is a diagram illustrating a histogram without a saturated portion of FIG. 3A.

FIG. 3A is a diagram illustrating an example of a histogram of an input image, and FIG. 3B is a diagram illustrating an accumulative distribution curve of frequencies with respect to image levels calculated from the histogram of FIG. 3A. FIG. 3C is a diagram illustrating a histogram without a saturated portion of FIG. 3A.

Figure 4A:
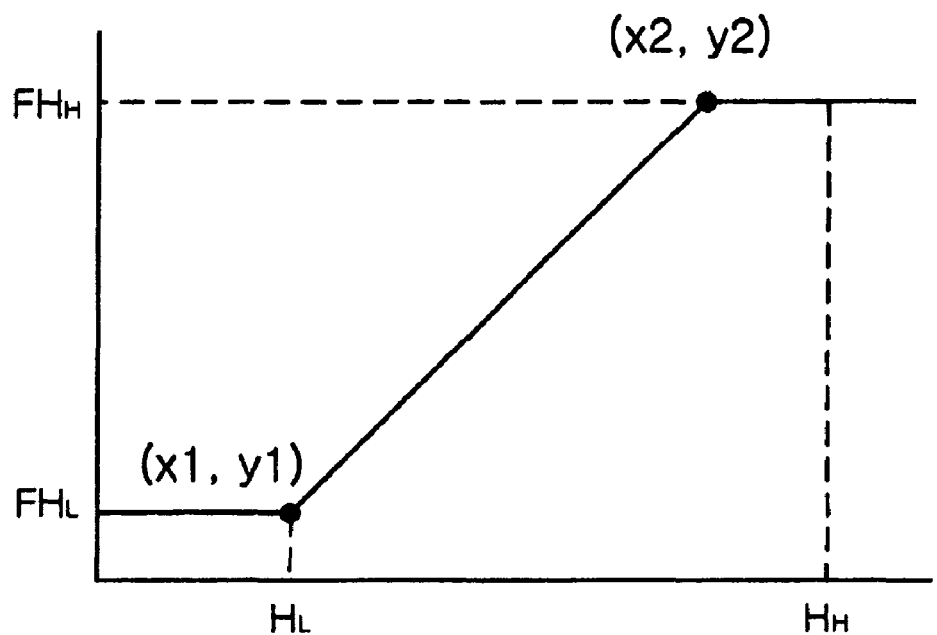
FIGS. 4A and 4B are diagrams showing an example of a linear function applied to mapping a maximum value and a minimum value of an image level of a portion that is to undergo histogram stretching, in order to calculate a modified maximum expansion level and a modified minimum expansion level.
Figure 4B:
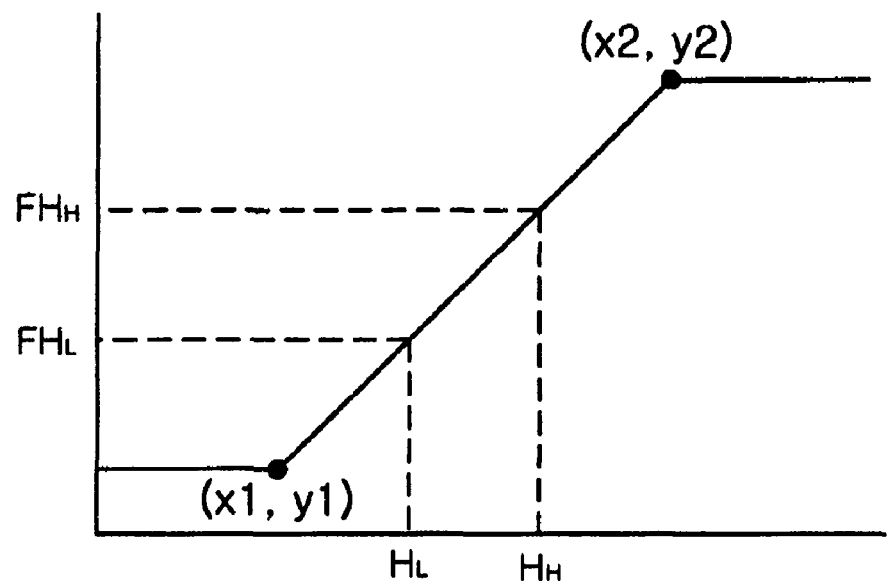

FIGS. 4A and 4B are diagrams showing an example of a linear function applied to mapping a maximum value and a minimum value of an image level of a histogram stretching portion in order to calculate a modified maximum expansion level and a modified minimum expansion level.

Figure 5A:
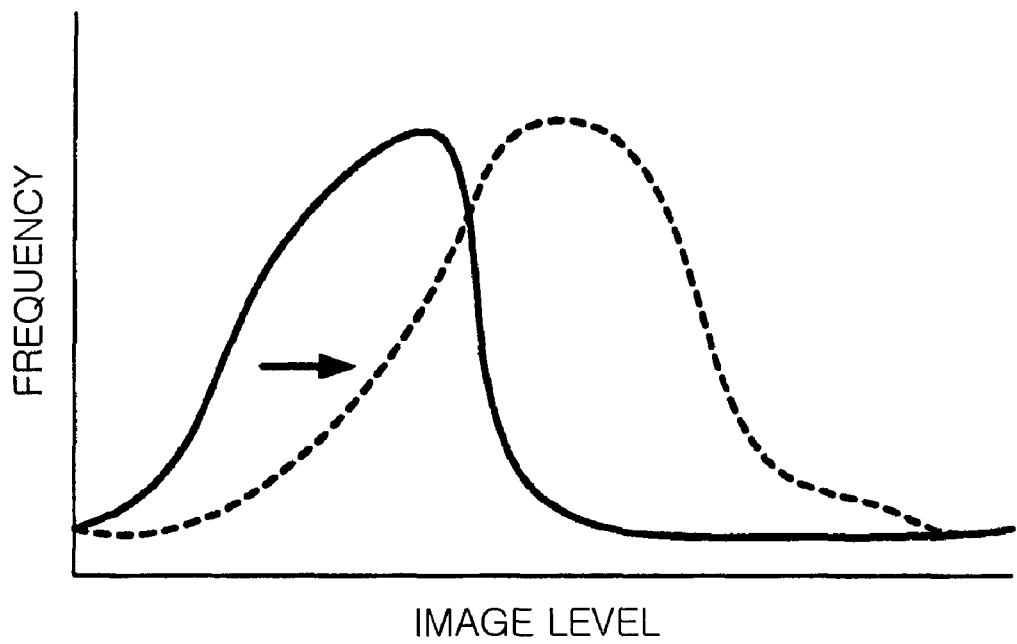
FIGS. 5A and 5B are diagrams illustrating examples of histograms of input images having a frequency distribution skewed to dark and bright sides.
Figure 5B:
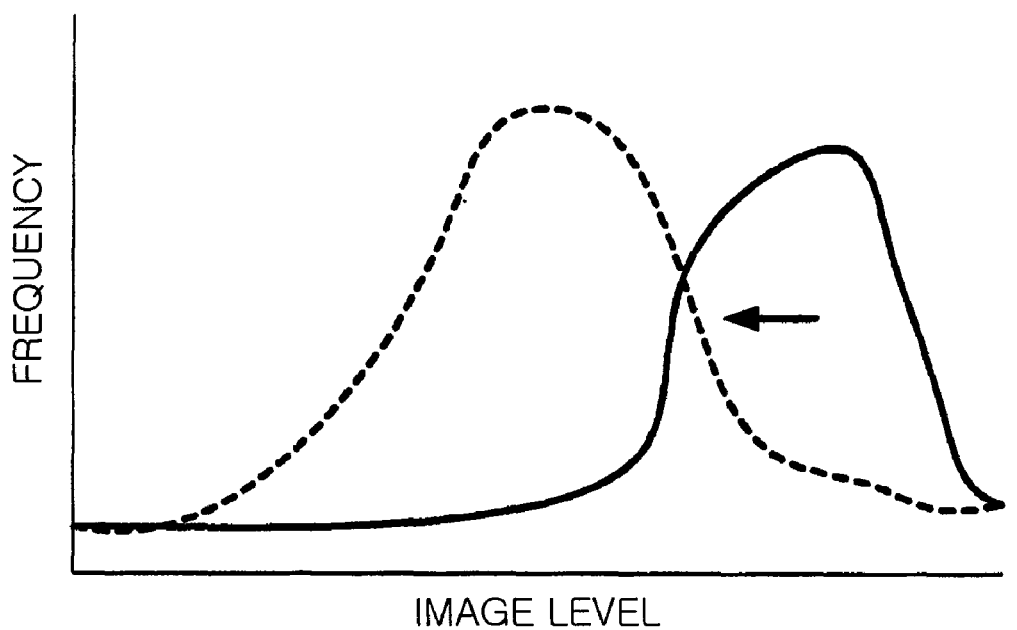

FIGS. 5A and 5B are diagrams illustrating examples of histograms of input images having a frequency distribution skewed to dark and bright sides.

Figure 6:
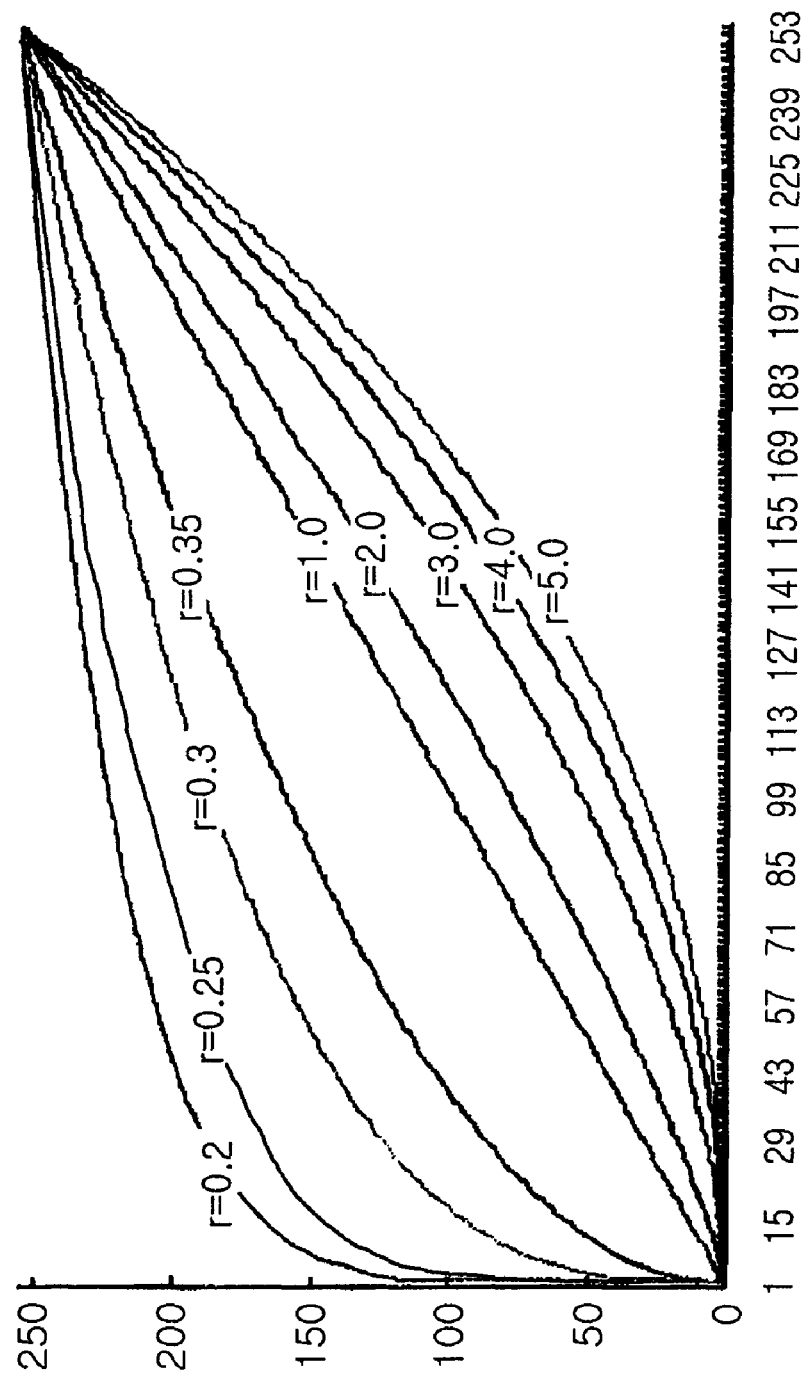
FIG. 6 is diagram showing examples of gamma curves.

FIG. 6 is diagram showing examples of gamma curves.

FIGS. 7A and 7B and FIGS. 8A and 8B illustrate results of application of the histogram stretching method according to the embodiment of the present invention.

Hereinafter, the operation and effect of the present invention will be described in more detail in processing order of an input image with reference to FIGS. 1 through 8B.

In operation S11, when an input signal to undergo histogram stretching is input, the histogram calculation unit 11 calculates a histogram displaying a relation between an image level of each pixel of the input image and the number of pixels having the image level, i.e., the frequency. For example, as shown in FIG. 3A, an x-axis of the histogram may represent an image level, and a y-axis thereof may represent the number of pixels of each image level, i.e., the frequency. The image level may be variously determined according to various color areas (e.g., YCbCr, YUv, RGB or the like) expressing colors, and its numerical range may also be variously determined according to the color areas. In this application, a Y (brightness) component of a YCbCr color space indicated by a value ranging from 0 to 255 will be described as an example.

The histogram of the input image calculated by the histogram calculation unit 11 is sent to the histogram analysis unit 12. In operation S12, the histogram analysis unit 12 calculates an accumulative distribution of frequencies with respect to image levels by using the input histogram. FIG. 3B illustrates the accumulative distribution of frequencies calculated by the histogram analysis unit 12. The histogram analysis unit 12 determines a portion having an image level higher than a preset threshold level as a saturated portion in the accumulative distribution. In an example illustrated in FIG. 3, the histogram analysis unit 12 considers a portion having an image level higher than 250, which is a threshold level, as the saturated portion. For example, if the input image has a size of 640×480 (i.e., the total number of pixels is 307,200), an accumulative value of the frequency at the image level of 250 may be 297,200. Therefore, the accumulative number 10,000 having the image level higher than 250 is the saturated portion and thus is excluded from the histogram stretching.

In operation S13, the histogram calculation unit 11 determines a portion to be stretched (hereinafter, also referred to as a stretching portion) in the accumulative distribution without the saturated portion. For example, referring to FIG. 3B, 30,720 and 297,000, which are values determined by applying a proper margin to the outermost values of an area ranging from 0 to 297,200 excluding the saturated portion in the accumulative distribution may be determined as a maximum value and a minimum value of the stretching portion, respectively. A median value between the two values may be determined as a median value of the stretching portion. Various methods may be used to obtain the maximum, minimum and median values of the stretching portion in the accumulative distribution. Thereafter, the histogram calculation unit 11 determines an image level corresponding to the maximum and minimum values of the stretching portion from the accumulative distribution. That is, the histogram calculation unit 11 may determine an image level corresponding to the maximum value of the stretching portion in the accumulative distribution as a maximum value $H_H$ of an image level of the stretching portion. Also, the histogram calculation unit 11 may determine an image level corresponding to the minimum value of the stretching portion in the accumulative distribution as a minimum value $H_L$ of an image level of the stretching portion. Likewise, the histogram calculation unit 11 may determine an image level corresponding to a median value of the stretching portion in the accumulative distribution as a median value $H_M$ of the image level of the stretching portion.

In operation S14, the linear-function application unit 13 maps the maximum value and the minimum value of the image level area of the stretching portion to a preset linear function. In a histogram stretching technique, a range of expansion through the histogram stretching may be set beforehand. a maximum value and a minimum value of the preset range of expansion (i.e., a maximum expansion level and a minimum expansion level) may be a maximum value and a minimum value that the image level can generally have. However, if these general maximum and minimum expansion levels are applied to, e.g., a monochromatic image having a very narrow frequency distribution of a histogram, stretching is made excessively relative to an input image, causing distortion of colors. Accordingly, as shown in FIG. 4, the preset maximum and minimum expansion levels can be modified for an image having a very narrow histogram distribution such as a monochromatic image by using a linear function which changes linearly between the preset maximum expansion level and the preset minimum expansion level.

As shown in FIG. 4, the linear function is determined by two points of (x1, y1) and (x2, y2). A value of y1 is the preset minimum expansion level, and a value of y2 is the preset maximum expansion level. As for the linear function, the minimum expansion level and the maximum expansion level are maintained constantly in an area smaller than x1 and an area greater than x2, respectively, and a straight line connecting these two points is expressed by {(y2−y1)/(x2−x1)×(I−x1)+y1} where I represents the maximum value $H_H$ and the minimum value $H_L$ of the image level calculated by the histogram calculation unit 11.

FIG. 4A illustrates a linear function for a general image, i.e., for the case where a maximum value $H_H$ and a minimum value $H_L$ of an image level calculated by the histogram calculation unit 11 have a sufficiently long interval therebetween. In this case, an initially set range is maintained even if a modified expansion range is determined by mapping the maximum value $H_H$ and the minimum value $H_L$ of the image level calculated by the histogram calculation unit 11 to the linear function. However, FIG. 4B illustrates a linear function for a monochromatic image as an example. In this case, a difference between a maximum value $H_H$ and a minimum value $H_L$ of an image level calculated by the histogram calculation unit 11 is small. For this reason, if mapping is performed using the linear function, the mapping is made by the straight line connecting the two points expressed by {(y2−y1)/(x2−x1)×(I−x1)+y1}. As shown in FIG. 4, an interval between a modified maximum expansion level $FH_H$ and a modified minimum expansion level $FH_L$ has almost no difference from an interval between the maximum value $H_H$ and the minimum value $H_L$ of the image level calculated by the histogram calculation unit 11. Accordingly, an image output by the histogram stretching may be similar to an input image, and thus distortion occurring in the monochromatic image or the like due to the stretching can be prevented.

The maximum value $H_H$, the minimum value $H_L$ and the median value $H_M$ of the image level range for stretching output from the histogram analysis unit 12 are input to the gamma-curve application unit 14. The gamma-curve application unit 14 selects a gamma curve having a gamma value determined with reference to the median value $H_M$ of the image level range to modify the maximum value $H_H$ and the minimum value $H_L$ of the image level range. As indicated by a solid line of FIG. 5A, an image having a histogram frequency distribution skewed to a dark side still has a skewed distribution even after the stretching, and thus the stretching does not have significant effects of contrast enhancement. Likewise, as indicated by a solid line of FIG. 5B, an image having a histogram frequency distribution skewed to a bright side still has a skewed distribution even after the stretching, and thus the stretching does not have significant effects of contrast enhancement. For this reason, as indicated by dotted lines of FIGS. 5A and 5B, if the histogram stretching is performed on those images after an image level is moved to a middle area, the effect of contrast enhancement can be further improved. To this end, according to the present invention, the mapping is performed through the gamma curve.

In many cases, the gamma curve is used for display devices to correct distortion expressed in a dark color and is expressed by Equation 3 below:

$$s = cr^\gamma \quad \text{Equation 3}$$

where r represents an input level, c and r represent positive numbers, and s represents an output level.

FIG. 6 illustrates gamma curves expressed by Equation 3. As shown in FIG. 6, the gamma curves have various shapes according to various gamma (γ) values. The gamma curves of FIG. 6 are obtained by normalizing an input value and an output value as values ranging from 0 to 255. Referring to FIG. 6, the gamma curves differ in shapes according to the gamma (γ) values. When the gamma curve is used to move a histogram of an image having a histogram frequency distribution skewed toward the dark and bright sides as shown in FIGS. 5A and 5B, a histogram of a high level can be moved if the gamma value is greater than 1, and a histogram of a low level can be moved to a middle portion if the gamma value is smaller than 1. According to the present invention, the median value $H_M$ of the image level calculated from the histogram of the input image is analyzed to modify an input image having a histogram frequency distribution, which is skewed toward a dark side or a bright side, through mapping using a gamma curve having a proper gamma value.

The median value $H_M$ calculated by the histogram analysis unit 12 may be understood as a value representing a middle portion of a histogram. An input image may be modified with reference to the median value $H_M$. For example, in the case where an image level is expressed within a range of 0 to 255, if the median value $H_M$ of the image level ranges from about 110 to about 130, it is determined that a histogram distribution is not skewed toward one side and thus a gamma curve having a gamma value of one may be used. Also, if the median value $H_M$ of the image level ranges from about 90 to about 110, a gamma curve having a gamma value of 0.5 may be selected. If the median value $H_M$ of the image level ranges from about 70 to about 90, a gamma curve having a gamma value of 0.3 may be selected, and if the median value $H_M$ ranges from about 50 to about 70, a gamma curve having a gamma value of 0.1 may be selected. That is, as a histogram frequency distribution of an input image is skewed toward a darker side, a gamma curve for modifying an input image to a greater extent may be selected.

Likewise, in the case of an input image having a histogram frequency distribution skewed toward a bright side, if the median value $H_M$ of the image level ranges from about 130 to about 150, a gamma curve having a gamma value of 1.2 may be selected, and if the median value $H_M$ of the image level ranges from about 150 to about 170, a gamma curve having a gamma value of 1.5 may be selected. Thus, a histogram frequency distribution skewed toward a bright side can be moved to a middle portion.

A maximum value $GH_H$ and a minimum value $GH_L$ of a moved histogram, i.e., a modified image level can be obtained by mapping the maximum value $H_H$ and the minimum value $H_L$ of the image level calculated by the histogram analysis unit 12 to the gamma curve having a gamma value selected with reference to the median value $H_M$ of the image level.

Thereafter, the histogram stretching unit 15 applies the modified maximum expansion level $FH_H$, the modified minimum expansion level $FH_L$, the modified maximum value $GH_H$ of the image level and the modified minimum value $GH_L$ of the image level to a known histogram stretching such as Equation 1 above, thereby deducing Equation 4 below:

$$L_{out}(FH_H - FH_L) \times \frac{L_{in} - GH_L}{GH_H - GH_L} + FH_L \quad \text{Equation 4}$$

The histogram stretching unit 15 corrects an image level $L_{in}$ of each pixel of the input image by using Equation 1 above and outputs a corrected image level $L_{out}$, thereby terminating the histogram stretching on the input image.

FIGS. 7A and 7B and FIGS. 8A and 8B illustrate results of application of a histogram stretching method according to the present invention.

Figure 7A:
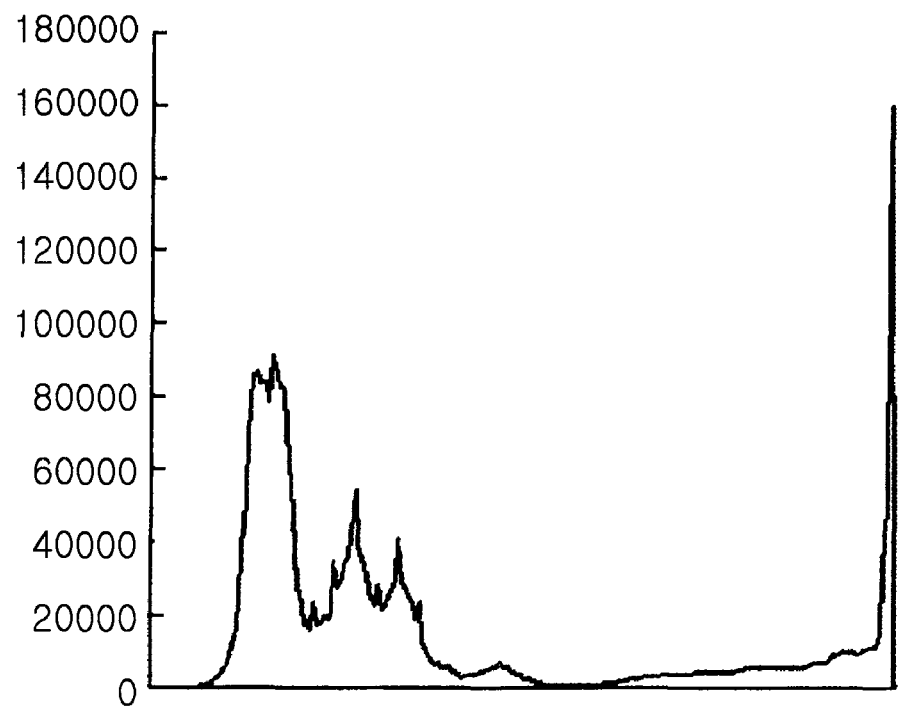
FIGS. 7A and 7B and FIGS. 8A and 8B illustrate results of application of the histogram stretching method according to the embodiment of the present invention.
Figure 8A:
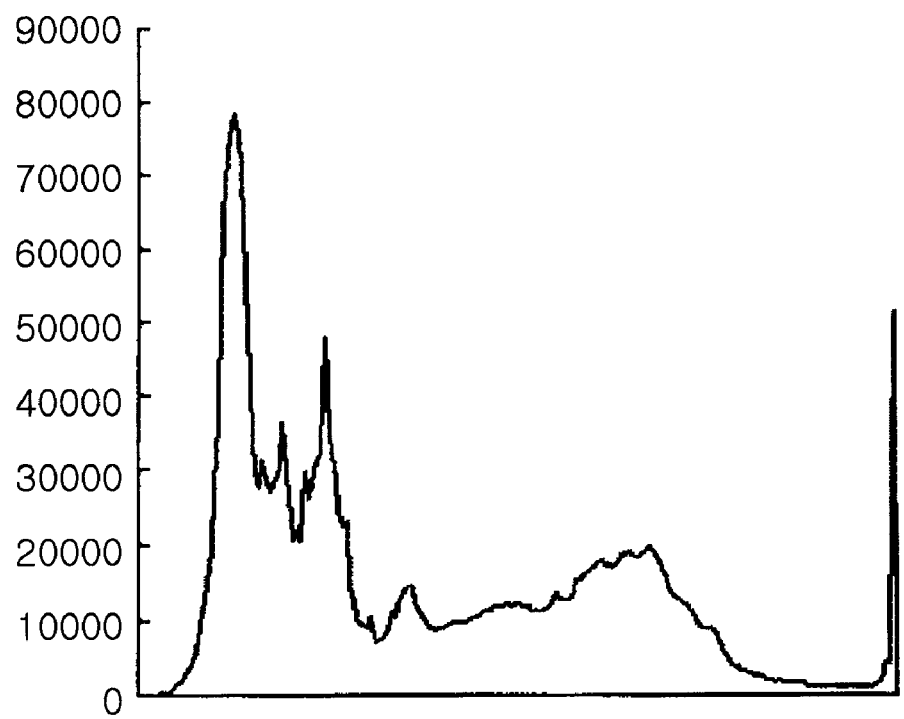

Referring to diagrams showing histogram distributions illustrated in FIGS. 7A and 8A, most of pixels exist in a dark side, and many pixels exist in a very bright side. An example of an image having such a histogram may be an image taken in a back light situation where the Sun exists on buildings. The sunshine in the image spreads at the bright side, and the rest of objects of the image are captured to be dark. Thus, it can be seen that the histogram distribution is skewed toward a dark side. 70 and 74 were calculated as median values $H_M$ of image levels of two images of FIGS. 7A and 8A, respectively, and thus the calculation was made with the gamma value set to 0.2.

Figure 7B:
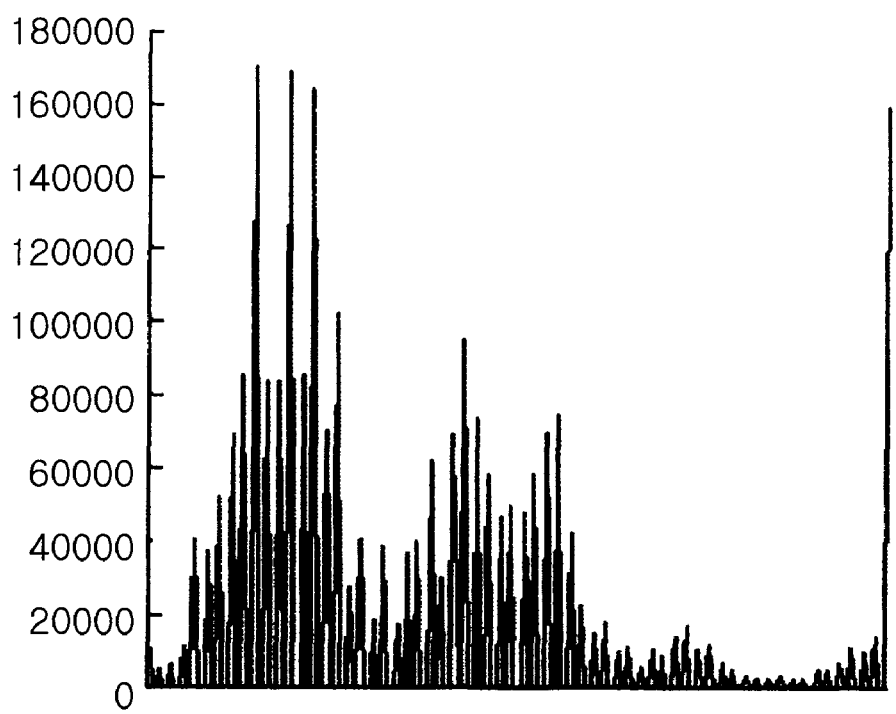
Figure 8B:
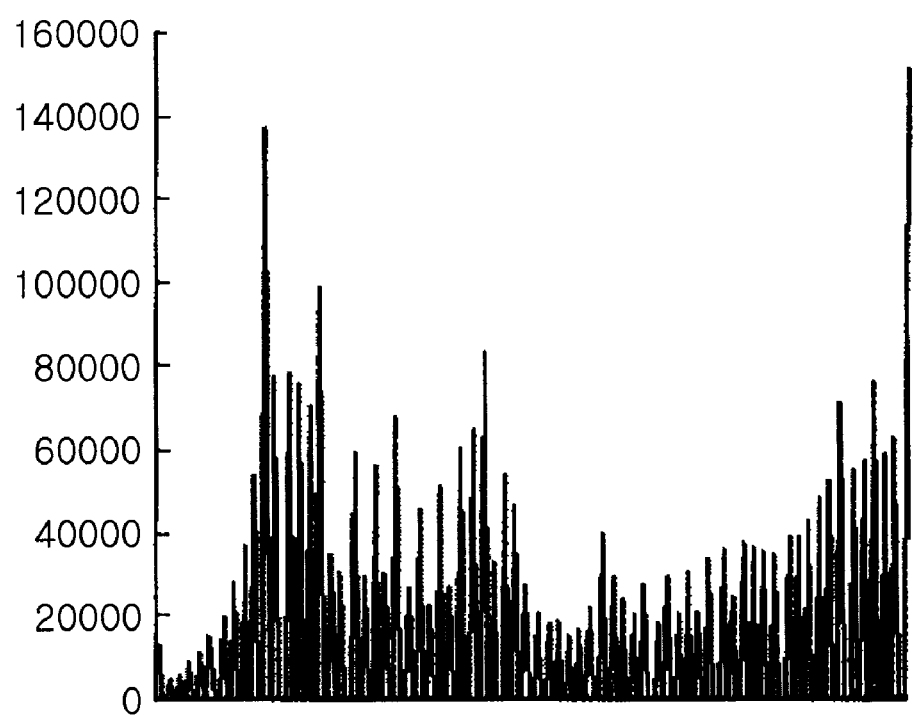

FIGS. 7B and 8B illustrate histogram distributions of images after histogram stretching. It can be seen that a minimum value of an image level of a dark side is stretched to a level zero, thereby enhancing the contrast. Also, the histogram distribution skewed toward a dark side is moved by using the gamma value of 0.2 to make the image brighter.

According to the present invention, histogram stretching is performed after a saturated portion in an image caused by very bright lighting such as the sunlight is removed. Therefore, an effect of the stretching can be improved.

Also, according to the present invention, the stretching is performed without distortion of an image even if the image is a monochromatic image. Thus, an image with excellent sharpness can be obtained.

According to the present invention, an effect of the histogram stretching can be improved by adjusting entire image levels of an image having a histogram frequency distribution skewed toward a dark side or a bright side before the stretching operation.

While the present invention has been shown and described in connection with the exemplary embodiments, it will be apparent to those skilled in the art that modifications and variations can be made without departing from the spirit and scope of the invention as defined by the appended claims.

What is claimed is:

1. A histogram stretching apparatus for improving contrast of an image by stretching a histogram of an input image within a range of a preset maximum expansion level to a preset minimum expansion level, the histogram stretching apparatus comprising:
   a histogram calculation unit calculating a histogram displaying a frequency according to an image level of each pixel included in an input image;
   a histogram analysis unit obtaining an accumulative distribution of the frequency according to the image level from the calculated histogram, determining a maximum value, a minimum value and a median value of an accumulative distribution of an area on which the histogram stretching is to be performed, and determining a minimum value, a maximum value and a median value of an image level area corresponding to the maximum value, the minimum value and the median value of the accumulative distribution;
   a linear-function application unit mapping the maximum value and the minimum value of the image level area determined at the histogram analysis unit to a linear function that changes linearly between the maximum expansion level and the minimum expansion level to calculate a modified maximum expansion level and a modified minimum expansion level;
   a gamma-curve application unit selecting a gamma curve with reference to the median value of the image level and mapping the minimum value and the maximum value of the image level to the selected gamma curve to calculate a modified maximum value and a modified minimum value of an image level; and
   a histogram stretching unit modifying an image level of each pixel of the input image by using the modified maximum expansion level, the modified minimum expansion level, the modified maximum value of the image level, and the modified minimum value of the image level.

2. The histogram stretching apparatus of claim 1, wherein the histogram analysis unit obtains the accumulative distribution of the frequency according to the image level from the calculated histogram, determines a portion having an image level higher than a preset threshold level as a saturated portion in the accumulative distribution, determines a maximum value, a minimum value and a median value of an accumulative distribution area excluding the saturated portion from the accumulative distribution, and determines a maximum value, a minimum value and a median value of the image level corresponding to the maximum value, the minimum value and the median value of the accumulative distribution area excluding the saturated portion.

3. The histogram stretching apparatus of claim 1, wherein the gamma-curve application unit selects a gamma curve having a greater gamma value as the median value of the image level is greater, and maps the minimum value and the maximum value of the image level to the selected gamma curve.

4. The histogram stretching apparatus of claim 1, wherein the histogram stretching unit modifies the image level of each pixel of the input image by using an equation below:

$$L_{out}(FH_H - FH_L) \times \frac{L_{in} - GH_L}{GH_H - GH_L} + FH_L$$

where $L_{out}$ represents a modified image level, $L_{in}$ represents an input image level, $FH_H$ represents a modified maximum expansion level, $FH_L$ represents a modified minimum expansion level, $GH_H$ represents a modified maximum value of an image level, and $GH_L$ represents a modified minimum value of an image level.

5. A histogram stretching method for improving contrast of an image by stretching a histogram of an input image within a range of a preset maximum expansion level to a preset minimum expansion level, the histogram stretching method comprising:
   calculating a histogram displaying a frequency according to an image level of each pixel of an input image;
   obtaining an accumulative distribution of the frequency according to the image level of the pixel of the input image;
   determining a maximum value, a minimum value and a median value of an accumulative distribution of an area on which histogram stretching is to be performed, from the accumulative distribution of the frequency according to the image level, and then determining a minimum value, a maximum value and a median value of an image level area corresponding to the maximum value, the minimum value and the median value of the accumulative distribution;
   mapping the maximum value and the minimum value of the image level area to a linear function that changes linearly between the maximum expansion level and the minimum expansion level to calculate a modified maximum expansion level and a modified minimum expansion level;

selecting a gamma curve with reference to the median value of the image level;

mapping the minimum value and the maximum value of the image level to the selected gamma curve to calculate a modified maximum value and a modified minimum value of the image level; and modifying the image level of each pixel of the input image by using the modified maximum expansion level, the modified minimum expansion level, the modified maximum value of the image level and the modified minimum value of the image level.

6. The histogram stretching method of claim 5, wherein the determining a minimum value, a maximum value and a median value of an image level area comprises:

determining a portion having an image level higher than a preset threshold level as a saturated portion in the accumulative distribution of the frequency according to the image level;

determining a maximum value, a minimum value and a median value of an accumulative distribution area excluding the saturated portion from the accumulative distribution; and determining a maximum value, a minimum value and a median value of the image level corresponding to the maximum value, the minimum value and the median value of the accumulative distribution area excluding the saturated portion.

7. The histogram stretching method of claim 5, wherein the selecting a gamma curve comprises selecting a gamma curve having a greater gamma value as the median value of the image level is greater.

8. The histogram stretching method of claim 5, wherein the modifying the image level of each pixel of the input image comprises modifying the image level of each pixel of the input image by using an equation below:

$$L_{out}(FH_H - FH_L) \times \frac{L_{in} - GH_L}{GH_H - GH_L} + FH_L$$

where $L_{out}$ represents a modified image level, $L_{in}$ represents an input image level, $FH_H$ represents a modified maximum expansion level, $FH_L$ represents a modified minimum expansion level, $GH_H$ represents a modified maximum value of an image level, and $GH_L$ represents a modified minimum value of an image level.

* * * * *